United States Patent [19]

Elias

[11] 4,209,126

[45] Jun. 24, 1980

[54] PATCH TOP CLOSURE MEMBER INCLUDING A MONOAXIALLY ORIENTED FILM LAYER

[75] Inventor: Thomas C. Elias, Ballwin, Mo.

[73] Assignee: Boise Cascade Corporation, Boise, Id.

[21] Appl. No.: 3,034

[22] Filed: Jan. 12, 1979

[51] Int. Cl.² .................... B65D 5/64; B65D 39/00
[52] U.S. Cl. ........................ 229/43; D9/255;
D9/256; D9/281; 215/232; 215/250; 215/258;
220/270; 220/359; 428/910; 229/5.5; 229/5.7;
229/3.5 MF
[58] Field of Search ............ D9/255, 256, 281;
428/80, 910; 215/209, 232, 254, 258, 250;
229/43, 7 R, 3.5 MF, 48 T, 5.5, 48 SA, 5.7;
220/359, 270, 266

[56] References Cited

U.S. PATENT DOCUMENTS

| 2,925,188 | 2/1960 | Grumbles | 215/232 X |
|---|---|---|---|
| 3,317,070 | 5/1967 | Rausing et al. | 215/258 X |
| 3,434,651 | 3/1969 | Stec | 229/43 |
| 3,655,503 | 4/1972 | Stanley et al. | 229/48 T X |
| 3,701,454 | 10/1972 | Thorp | 220/270 |
| 3,777,968 | 12/1973 | Law | 229/43 X |
| 4,103,802 | 8/1978 | Piltz et al. | 229/43 X |

FOREIGN PATENT DOCUMENTS 2504346  8/1975  Fed. Rep. of Germany .......... 215/254

Primary Examiner—George F. Lesmes
Assistant Examiner—Alexander S. Thomas
Attorney, Agent, or Firm—Lawrence E. Laubscher

[57] ABSTRACT

A partial opening patch top closure member for containers is disclosed including at least one layer of monoaxially oriented synthetic plastic film the grain pattern of which extends in a given direction. The closure member includes body and tab portions so arranged relative to the grain pattern of the film that upon pulling of the tab portion, a section of the body portion is torn from the body portion along a line of tear parallel with the grain pattern, thereby leaving bonded to the container a residual body portion section containing a dispensing opening. Preferably the line of tear is at least partially defined by a tear-initiating cut contained in a juncture between the tab and body portions.

5 Claims, 10 Drawing Figures

U.S. Patent  Jun. 24, 1980  Sheet 1 of 3  4,209,126
Fig. 1
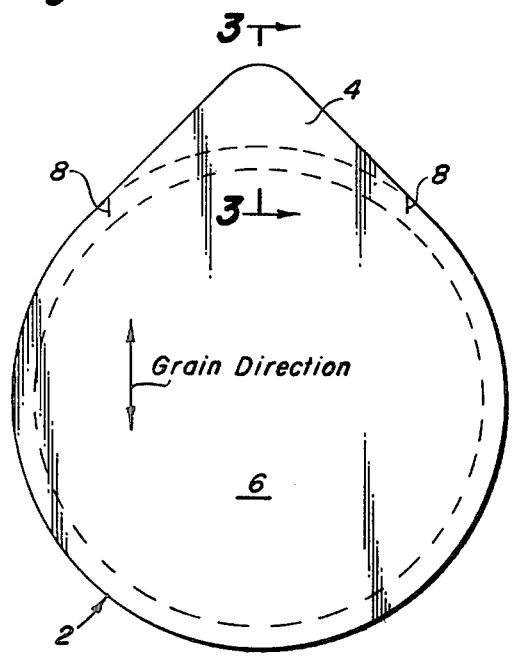
Fig. 2
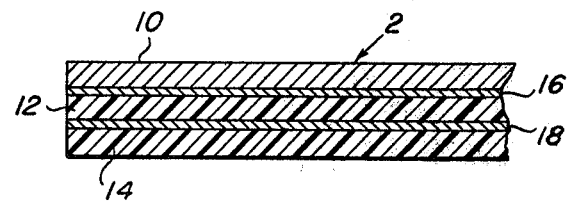
Fig. 1a
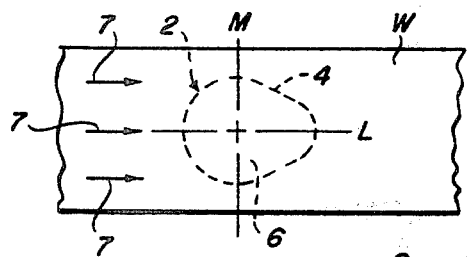
Fig. 3
Fig. 4
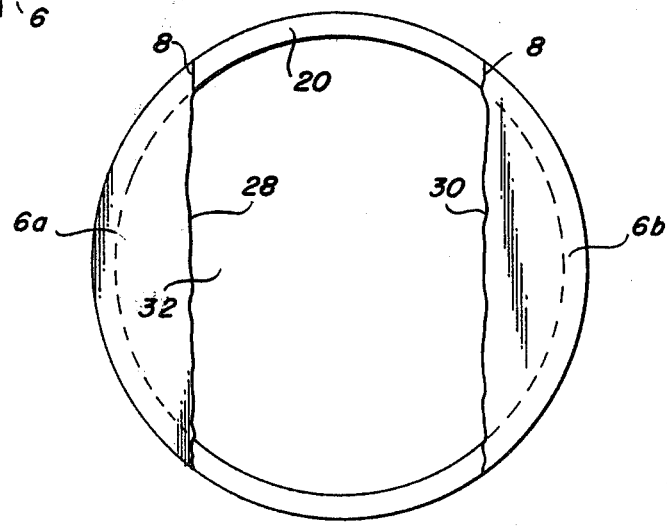

PATCH TOP CLOSURE MEMBER INCLUDING A MONOAXIALLY ORIENTED FILM LAYER

BRIEF DESCRIPTION OF THE PRIOR ART

The use of membrane type closures for containers is well known in the patented prior art, as evidenced, for example, by the patents to Stec U.S. Pat. No. 3,434,651 and Christensson U.S. Pat. No. 3,776,450. The Beckers U.S. Pat. No. 3,942,676 discloses a foil closure member containing a removable portion and the Ellerbrock application Ser. No. 932,137 filed Aug. 8, 1978, (and assigned to the same assignee as the present invention) discloses a partial opening patch top closure member operable to dispense a fluid or granular material from a container in a controlled manner.

One problem encountered by the prior partial-opening patch top closure members is that of accurately defining the tear line along which the closure is torn for forming the dispensing opening in the residual section. In order to accurately define a tear line and hence the size and configuration of a dispensing opening, it has been proposed in the prior art to score the patch top members, thereby requiring a further manufacturing step which increases cost of the resulting closure member.

The present invention was developed to avoid the above and other drawbacks of the known membrance closure members.

SUMMARY OF THE INVENTION

The primary object of the present invention is to provide an improved flexible patch top member for closing one end of a hollow container, said patch top member including at least one layer of monaxially oriented film, said closure member having a body portion bonded to the container end, and a pull tab portion for tearing a removable section from the body portion along a line of tear parallel with the grain pattern, thereby to define in the residual body section a dispensing opening of a desired shape and configuration.

According to a more specific object of the invention, a slit is provided at the juncture between the pull tab and body portions of the flexible patch top member for initiating the tearing of the tab and removable section from the residual section. In a first embodiment, the tab is symmetrically arranged with the body portion, and a pair of slits are provided at both junctures between the pull tab and body portions, whereby the removable section will be defined between two tear lines each originating at the slits adjacent the pull tab portion. In a second embodiment, the pull tab portion is asymmetrically arranged relative to said body portion, a tear-initiating slit being provided at the juncture between the tab and body portions for initiating a line of tear across the body portion in the direction of the grain pattern.

According to a further object of the invention, the body portion of the patch top has a circular configuration and is bonded to the reversely outwardly curled end portion of a cylindrical composite container having an inner liner layer, a fibrous body wall layer, and an outer label layer.

BRIEF DESCRIPTION OF THE FIGURES

Other objects and advantages of the invention will become apparent from a study of the following specification when viewed in the light of the accompanying drawing, in which:

FIG. 1 is a top plan view of a first embodiment of the patch top closure member of the invention;

FIG. 1a is a diagrammatic illustration of the manner in which the closure member is formed from the monoaxially oriented film;

FIG. 2 is a detailed sectional view of the patch top closure member;

FIG. 3 is a detailed sectional view of the first embodiment taken along line 3—3 of FIG. 1;

FIG. 4 is a top plan view of the first embodiment with the pull tab and removable first part torn away;

DETAILED DESCRIPTION

Figure 5:
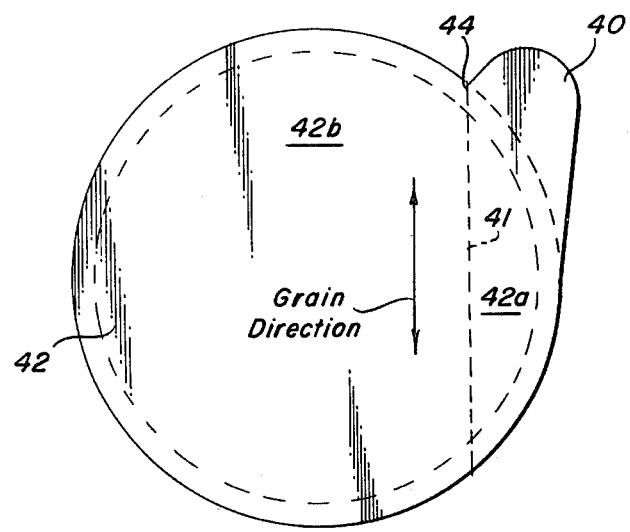
FIGS. 5 and 6 are top plan views of a second embodiment of the invention in its unopened and opened conditions, respectively.

Referring first more particularly to FIGS. 1 and 1a, the patch top closure member 2 is formed from a laminated web W including a layer of monoaxially oriented film, the closure member having a pull tab portion 4 that is symmetrically arranged relative to a body portion 6. As shown in FIG. 1a, the axis L of the pull tab portion 4 is generally parallel with the grain axis of the film (as illustrated by the arrows 7). In the illustrated embodiment, tear-initiating slits 8 are provided in the junctures between the tab and body portions, thereby to assist in the initial tearing of a removable section from the body portion 6, as will be described in greater detail below. In the alternative, a single slit may be provided at only one of the junctures between the tab and body portions without deviating from the inventive concept of the invention.

As shown more particularly in FIG. 2, the closure member 2 is a laminate having an upper layer 10 of foil (such as aluminum foil), an intermediate layer 12 consisting of a monoaxially oriented synthetic plastic film, and a lower layer 14 of bonding material, such as hot melt, a gel lacquer, polyethylene and its copolymers, ionomer, vinyl, or the like. The three layers are securely joined together by layers 16 and 18 of a suitable laminating adhesive or extruded laminate, such as polyethylene, thereby to form the laminated web. In the case of sealing materials, layer 14 may be directly bonded to the intermediate layer 12, whereby the intermediate layer 18 is eliminated. It is necessary that the materials of layers 12 and 14 be chosen so that the seal between layer 14 and the container can be accomplished below the temperature at which layer 12 will lose its orientation. The layer 12 of monoaxially oriented film may be formed from polypropylene, high density polyethylene, polyester, or other suitable monoaxially oriented material. It has been determined that PP-MONEX produced by Van Leer Plastics, Inc. is a suitable monoaxially oriented film which provides the desired tearing result when used as the laminated closure member. During the extrusion of such monoaxially oriented films, a grain pattern results in the film having a direction arranged normal to the axis of the extrusion machine roll (i.e., longitudinally of the film sheet). Films so produced have the property of tearing cleanly in a straight line parallel to the grain direction of the film. Forces which would tend to tear the film obliquely to the grain direction result in the tear turning to follow the grain direction. As shown in FIG. 1a, when forming a plurality of patch top closure members from the laminated web including the monoaxially oriented film, the closure members are so cut or stamped from the laminate that the direction of the desired line of tear resulting from pulling the pull tab portion of the closure member will extend parallel to the grain pattern.

As shown more particularly in FIG. 3, the body portion 6 of the closure member 2 is bonded in sealed relation by the layer 14 with the extremity of the reversely curled end portion of a composite container 20. As is known in the art, the composite container includes an outer label layer 22 (of foil, paperboard, foil-paper laminate or the like), a fibrous body wall layer 24 (of paperboard, for example), and an impervious inner liner layer 26 (of aluminum foil for example). The open end of the container is reversely curled upon itself so that the closure member 2 is bonded to the liner layer 26 of the container 20 by the bonding layer 14.

Pulling of the symmetrical pull tab portion 4 of the closure member 2 away from the container 20 results in an initial tearing of the body portion at the slits 8. As shown in FIG. 4, when the pull tab portion is pulled away from the container, a section is removed between two parallel lines of tear 28, 30 initiating at the slits 8 and extending in the direction of the grain of the monoaxially oriented film. Residual portions 6a,6b of the body portion 6 of the closure member remain bonded to the container open end to define a dispensing or pour opening 32 through which the contents of the container may be dispensed. The width of the tab portion 4 determines the location of the slots which in turn determines those grain lines along which the body portion will be severed, thereby defining the size of the removable and residual sections, respectively, and, consequently, the size of the dispensing opening.

Figure 6:
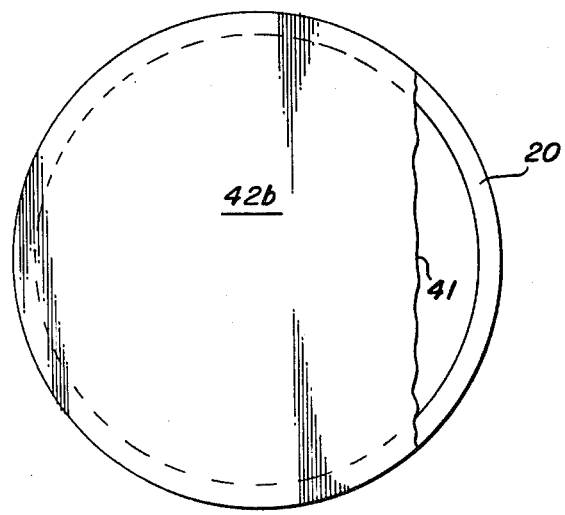

In FIG. 5, there is illustrated a second embodiment of the closure member in which the tab portion 40 is asymmetrically arranged relative to the body portion 42. In this embodiment, when the pull tab portion 40 is pulled away from the container 20, the body portion 42 is torn initially at the juncture between the tab and body portions along a single tear line 41 in the direction of the grain pattern, thereby defining the removable and residual sections 42a, and 42b, respectively, as shown in FIG. 6. A tear-initiating cut or slit 44 may be provided at the juncture between the tab and body portions to facilitate the tearing of the pull tab and removable section from the closure member.

Figure 7:
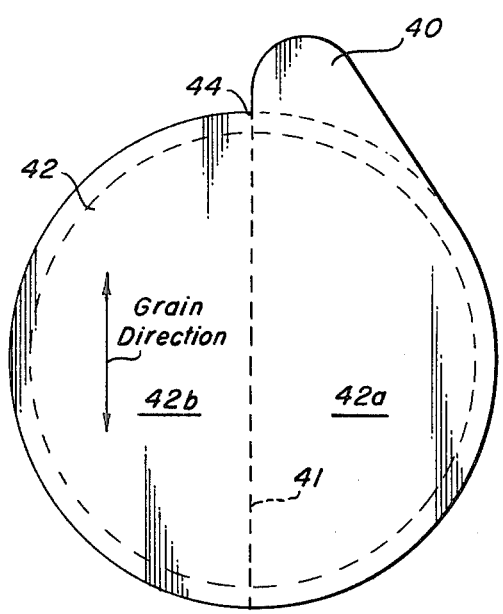
FIGS. 7 and 8 illustrate a modification of the embodiment of FIGS. 4 and 5.
Figure 8:
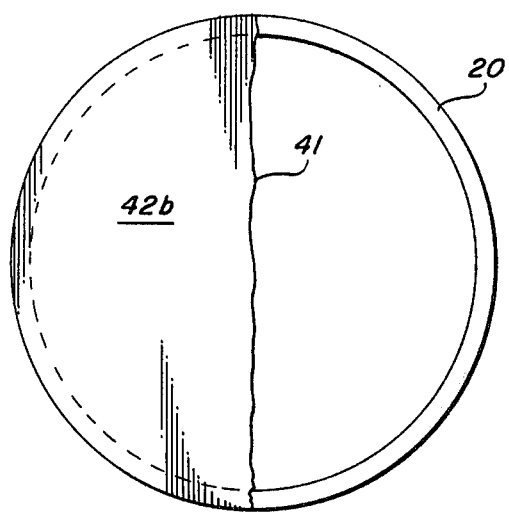

As shown in FIGS. 7 and 8, the location of the pull tab portion 40 in relation to the body portion 42 determines that grain line along which the body portion will be severed, thereby defining the size of the removable section 42a and residual section 42b, and consequently, the size of the dispensing opening.

Figure 9:
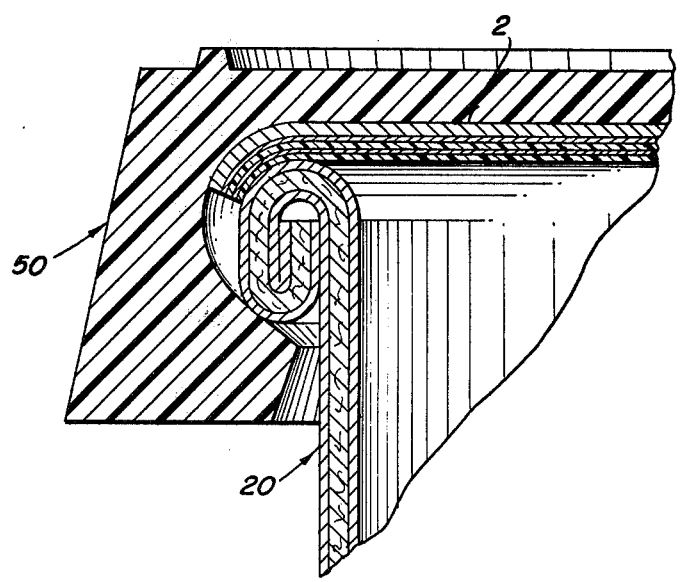
FIG. 9 is a detailed sectional view of the patch top closure member with an overcap.

As shown in FIG. 9, a protective synthetic plastic overcap 50 may be provided for protecting the patch top closure member during the shipping, handling and storing of the container.

While, in accordance with the provisions of the Patent Statutes, the preferred forms and embodiments of the invention have been illustrated and described, it will be apparent to those skilled in the art that various changes and modifications may be made in the described closure members without deviating from the inventive concepts set forth above.

What is claimed is:

1. A composite container of the patch top closure type, comprising
   (a) a vertically arranged tubular cylindrical body member including, in concentrically arranged layers,
      (1) an impervious inner liner layer;
      (2) at least one fibrous body wall layer; and
      (3) an outer label layer;
      (4) the upper end of said container body member being reversely curled outwardly, whereby said inner liner layer extends around the curled upper extremity of said body member; and
   (b) a flexible patch top member closing the reversely curled upper end of said body member, said patch top member including a generally circular disk-shaped body portion extending across the reversely curled upper end of said body member, and a pull tab portion extending radially outwardly from said body portion, said patch top member being of laminated construction including, in bonded layers,
      (1) an upper layer of metal foil;
      (2) a central layer of monoaxially oriented synthetic plastic film the grain pattern of which extends in a direction parallel with the longitudinal axis of said pull tab portion; and
      (3) a lower layer of adhesive material bonding said patch top member to said reversely curled body member upper end;
      (4) said patch top member containing in at least one juncture between said tab and body portions a tear-initiating cut, said pull tab portion being operable to tear a removable section from said body portion along a line of tear initiating at said cut and extending parallel with said given direction, whereby a residual section of said body portion containing a dispensing opening remains bonded to said container end.

2. A composite container as defined in claim 1, wherein said tab portion is symmetrically arranged relative to said body portion, thereby to define a pair of junctures between said tab and body portions.

3. A composite container as defined in claim 2, wherein each of the junctures between said tab and body portions contains a tear initiating cut.

4. A composite container as defined in claim 1, wherein said tab portion is asymmetrically arranged relative to said body portion and includes on one side an outer peripheral edge portion which is continuous and tangent to the peripheral edge of said body portion.

5. A composite container as defined in claim 1, wherein said monoaxially oriented film is selected from the group consisting of polypropylene, high density polyethylene, and polyester.

* * * * *